(12) United States Patent
Shiratori et al.

(10) Patent No.: US 8,708,579 B2
(45) Date of Patent: Apr. 29, 2014

(54) OPTOELECTRICAL CONNECTOR

(75) Inventors: Masayuki Shiratori, Tokyo (JP);
Takayoshi Yamauchi, Tokyo (JP);
Mitsuaki Kazou, Tokyo (JP); Shuichi Aihara, Tokyo (JP); Toshitaka Torikai, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 113 days.

(21) Appl. No.: 13/174,656

(22) Filed: Jun. 30, 2011

(65) Prior Publication Data
US 2012/0020629 A1    Jan. 26, 2012

(30) Foreign Application Priority Data
Jul. 23, 2010    (JP) .................................. 2010-166385

(51) Int. Cl.
G02B 6/36    (2006.01)
(52) U.S. Cl.
USPC .............................................. 385/93; 385/89
(58) Field of Classification Search
USPC .................... 385/75, 88, 89, 92, 93; 439/577, 439/607.01; 398/135, 139
See application file for complete search history.

(56) References Cited

U.S. PATENT DOCUMENTS

| 6,866,424 | B2 * | 3/2005 | Tanaka et al. .................... 385/55 |
| 7,086,878 | B2 * | 8/2006 | Mine et al. ...................... 439/137 |
| 7,354,205 | B2 * | 4/2008 | Sakata et al. ..................... 385/92 |
| 7,798,726 | B2 | 9/2010 | Sabo |
| 7,866,993 | B2 * | 1/2011 | Ohsumi ........................ 439/141 |
| 8,388,241 | B2 * | 3/2013 | He et al. .......................... 385/92 |
| 2007/0167076 | A1 * | 7/2007 | Seh et al. ....................... 439/607 |
| 2010/0226612 | A1 * | 9/2010 | Sedio et al. ..................... 385/93 |
| 2010/0290743 | A1 * | 11/2010 | Liao et al. ....................... 385/75 |
| 2013/0148930 | A1 | 6/2013 | Ko et al. |

FOREIGN PATENT DOCUMENTS

| JP | 2001-272574 | 10/2001 |
| JP | 2002-055263 | 2/2002 |
| JP | 2002-250847 | 9/2002 |
| JP | 2010-050092 | 3/2010 |
| JP | 2010-520569 | 6/2010 |
| JP | 2010-245040 | 10/2010 |
| JP | 2010-256906 | 11/2010 |

OTHER PUBLICATIONS

Japan Office action, dated Dec. 17, 2013 along with an english translation thereof.

* cited by examiner

Primary Examiner — Omar Rojas
(74) Attorney, Agent, or Firm — Greenblum & Bernstein, P.L.C.

(57) ABSTRACT

In an optoelectrical connector that is composed of a plug including an insertion fitting part and a receptacle including a housing space into which the insertion fitting part of the plug is inserted, the plug is provided with an optical connection part on a front end of the insertion fitting part and an electric connection part more rearward than the optical connection part. The receptacle is provided with an optical connection part on the deep side of the housing space and an electric connection part more frontward than the optical connection part. A shutter is formed on the immediate front of the optical connection part of the receptacle and the shutter opens in the optical connection. Deterioration of optical coupling efficiency caused by attachment of metal abrasion powder, which is generated in a slide between the electrical connection parts in the electrical connection, to the optical connection parts, is prevented.

10 Claims, 15 Drawing Sheets

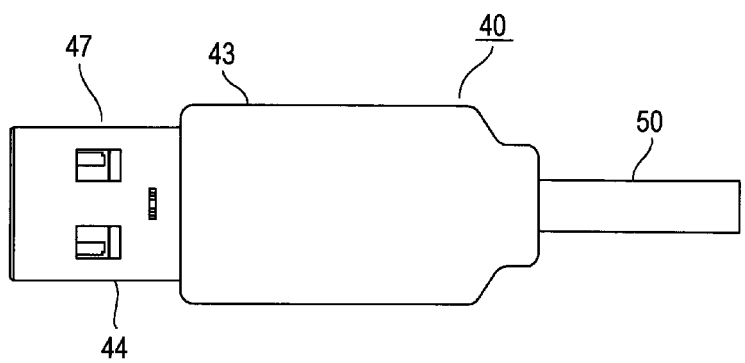
FIG. 3A
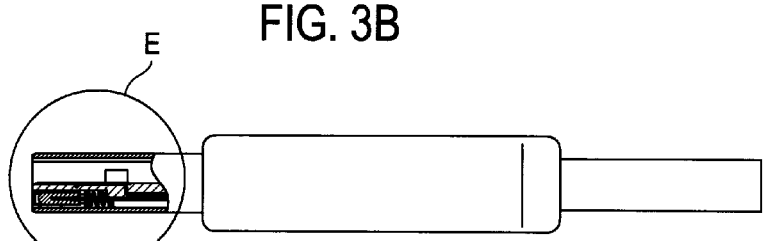
FIG. 3C
FIG. 3B
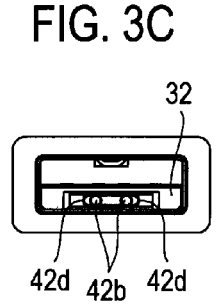
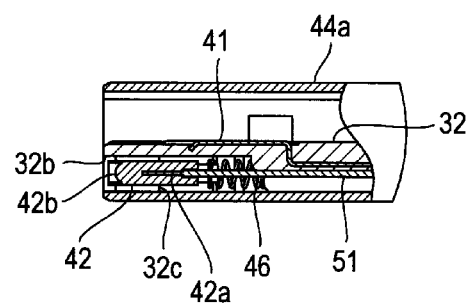
FIG. 3D

FIG. 6A
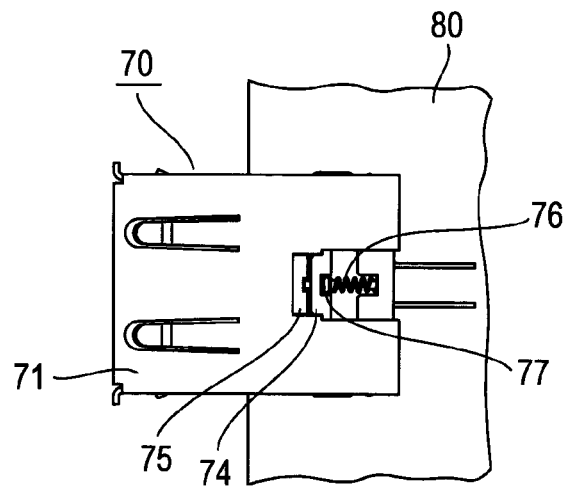
FIG. 6C
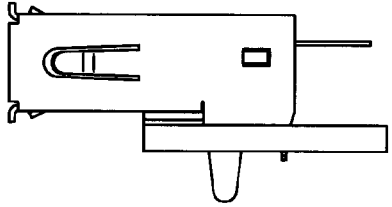
FIG. 6B
FIG. 6D
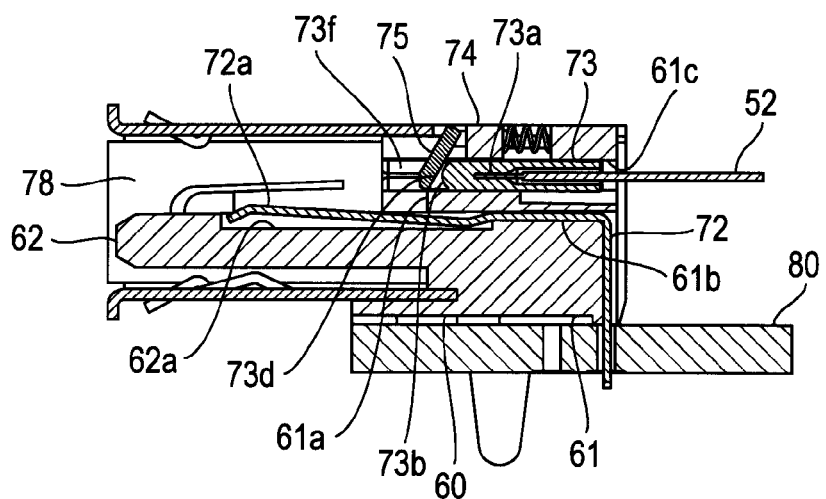

OPTOELECTRICAL CONNECTOR

TECHNICAL FIELD

The present invention relates to an optoelectrical connector having both of an optical connecting function and an electrical connecting function.

BACKGROUND ART

FIGS. 1A, 1B, and 1C illustrate the configuration of an optoelectrical connector which is disclosed in Japanese Patent Application Laid Open No. 2010-50092, as a prior art example of such kind of optoelectrical connector, which is composed of a plug and a receptacle. FIG. 1A illustrates a plug and FIG. 1B illustrates a plug which is partially disassembled. FIG. 1C illustrates a receptacle.

A plug 10 includes an insulation body 11, plug terminals which are mounted on the insulation body 11, and a metallic shell 12. The insulation body 11 includes a base part 13 which has a fitting surface 13a and a tongue piece 14 which is extended forward from the base part 13. On the base part 13, through holes in which optical fibers are housed are formed, and lenses 15 are disposed so as to be respectively housed in the through holes and protruded from the fitting surface 13a.

The metallic shell 12 is disposed so as to surround the base part 13, and an upper housing space 16 and a lower housing space 17 are formed respectively between the tongue piece 14 and a top plate of the metallic shell 12 and between the tongue piece 14 and a bottom plate of the metallic shell 12.

The plug terminals are composed of a plurality of first terminals and a plurality of second terminals. First terminals 18 are mounted on an upper surface of the tongue piece 14 so as to be exposed to the upper housing space 16. The second terminals are mounted on a lower surface of the tongue piece 14 so as to be exposed to the lower housing space 17, though the second terminals are hidden and are not shown in FIG. 1B.

A receptacle (socket) 20 includes an insulation body 21, socket terminals which are mounted on the insulation body 21, and a metallic shell 22 which covers the insulation body 21. The insulation body 21 includes a housing space 23 for housing the plug 10, a base part 24, and a first tongue piece 25 which is extended forward from the base part 24.

The socket terminals are composed of a plurality of first terminals and a plurality of second terminals. First terminals 26 are disposed on a lower surface of the first tongue piece 25. The insulation body 21 includes a second tongue piece 27 which is extended forward from the base part 24 so as to be parallel to the first tongue piece 25, and second terminals 28 are disposed on an upper surface of the second tongue piece 27.

Through holes are formed through the first tongue piece 25 and the base part 24, and lenses 29 are respectively supported by the through holes and positioned on an end part side of the first tongue piece 25. Optical fibers are housed in the through holes in a manner to correspond to rear ends of the lenses 29.

In this example, the receptacle 20 includes two stages which are an upper stage and a lower stage each of which is provided with the housing space 23, the first tongue piece 25, the second tongue piece 27, the first terminals 26, and the second terminals 28 which are described above.

In the optoelectrical connector composed of the plug 10 and the receptacle 20 described above, when the plug 10 is inserted into the receptacle 20, the first terminals 18 of the plug 10 are connected with the first terminals 26 of the receptacle 20, the second terminals of the plug 10 are connected with the second terminals 28 of the receptacle 20, and the lenses 15 of the plug 10 are inserted into the through holes, in which the lenses 29 of the receptacle 20 are positioned, so as to be opposed to the lenses 29, thus realizing optical connection (transmission of an optical signal).

As described above, in an optoelectrical connector which can perform both of optical connection and electric connection, optical connection parts and electric connection parts are positioned in the same space. Accordingly, there is a problem that metal abrasion powder which is generated by a slide of metallic terminals in electric connection easily attaches to the optical connection parts. For example, such situation can be generated that optical coupling efficiency is largely deteriorated by attachment of metal abrasion powder to a lens or the like.

Further, the optical connection part is exposed forward in the receptacle as shown in FIG. 1C, so that the optical connection part is easily cleaned. On the other hand, the optical connection part is positioned on a deep side of a space surrounded by the shell in the plug as shown in FIG. 1B, so that it is difficult to clean the optical connection part and even if metal abrasion powder attaches to the optical connection part, the metal abrasion powder cannot be easily removed.

SUMMARY OF THE INVENTION

The present invention has been implemented in view of the above described problem and it is an object of the present invention is to provide an optoelectrical connector that prevents metal abrasion powder which is generated by a slide between terminals performing electric connection from attaching to an optical connection part and thereby is able to prevent deterioration of optical coupling efficiency.

According to the present invention, in an optoelectrical connector composed of a plug configured to include an insertion fitting part and a receptacle configured to include a housing space into which the insertion fitting part of the plug is inserted, the plug includes an optical connection part on a front end of the insertion fitting part and an electric connection part positioned more rearward than the optical connection part, the receptacle includes an optical connection part on a deep side of the housing space and an electric connection part positioned more frontward than the optical connection part, a shutter is provided on an immediate front of the optical connection part of the receptacle, and the shutter is configured to open when the optical connection part of the plug and the optical connection part of the receptacle are optically connected with each other.

In the optoelectrical connector according to the present invention, the shutter is provided on the immediate front of the optical connection part of the receptacle and the shutter is configured to open in the optical connection. Therefore, even if metal abrasion powder is generated by a slide of the electric connection parts of the plug and the receptacle in the electric connection, attachment of the metal abrasion powder to the optical connection part of the receptacle is prevented. On the other hand, the optical connection part of the plug is positioned on the front end of the insertion fitting part and is positioned on a more front side in the insertion direction than the electric connection part, so that the metal abrasion powder hardly attaches to the optical connection part of the plug.

According to the present invention, such a problem can be cut down that optical coupling efficiency is deteriorated by attachment of the metal abrasion powder, which is generated by the slide of the electric connection parts, to the optical connection parts.

BRIEF DESCRIPTION OF THE DRAWINGS

FIG. 3A is a plan view of the plug of FIG. 2A;

FIG. 3B is a lateral view of the plug of FIG. 2A partially broken;

FIG. 3C is a front elevational view of the plug of FIG. 2A;

FIG. 3D is an enlarged view of an E part in FIG. 3B;

FIG. 6A is a plan view of the receptacle of FIG. 5A;

FIG. 6B is a lateral view of the receptacle of FIG. 5A;

FIG. 6C is a front elevational view of the receptacle of FIG. 5A;

FIG. 6D is an enlarged sectional view of the receptacle of FIG. 5A;

DETAILED DESCRIPTION OF THE EMBODIMENTS

Embodiments of the present invention will be described below.

Figure 1A:
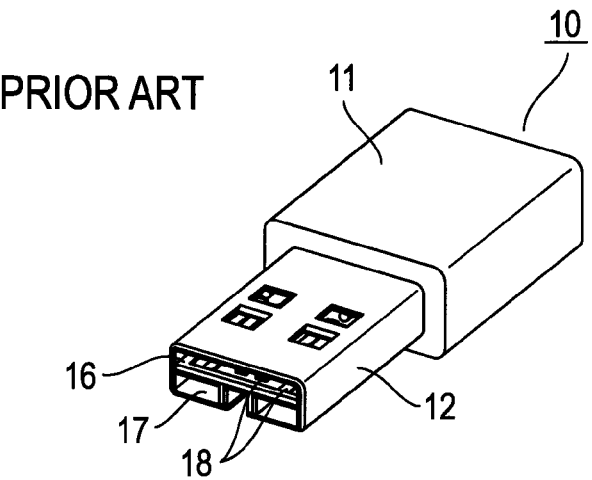
FIG. 1A is a perspective view showing a plug of an optoelectrical connector of the prior art.
Figure 1B:
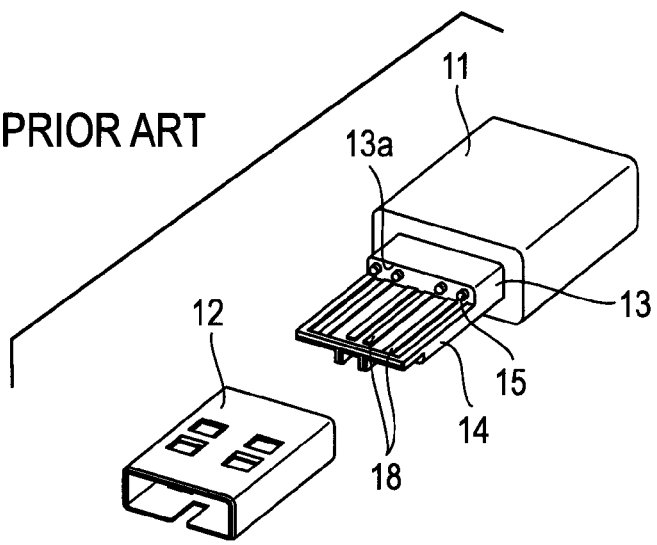
FIG. 1B is a perspective view showing a partially exploded plug of FIG. 1A.
Figure 1C:
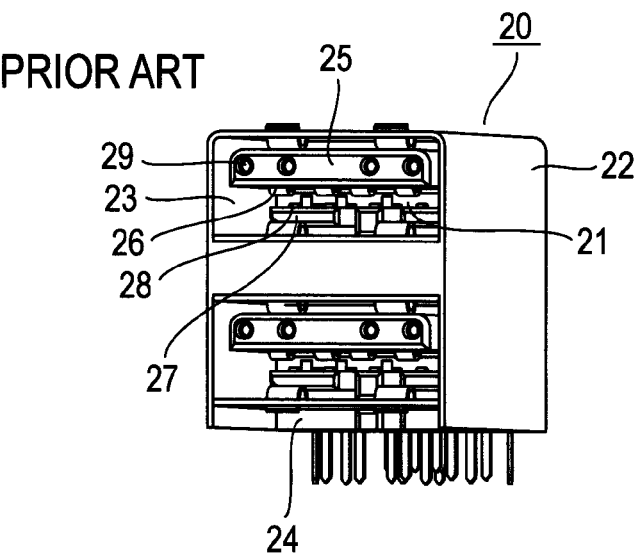
FIG. 1C is a perspective view showing a receptacle of the optoelectrical connector of the prior art.
Figure 2B:
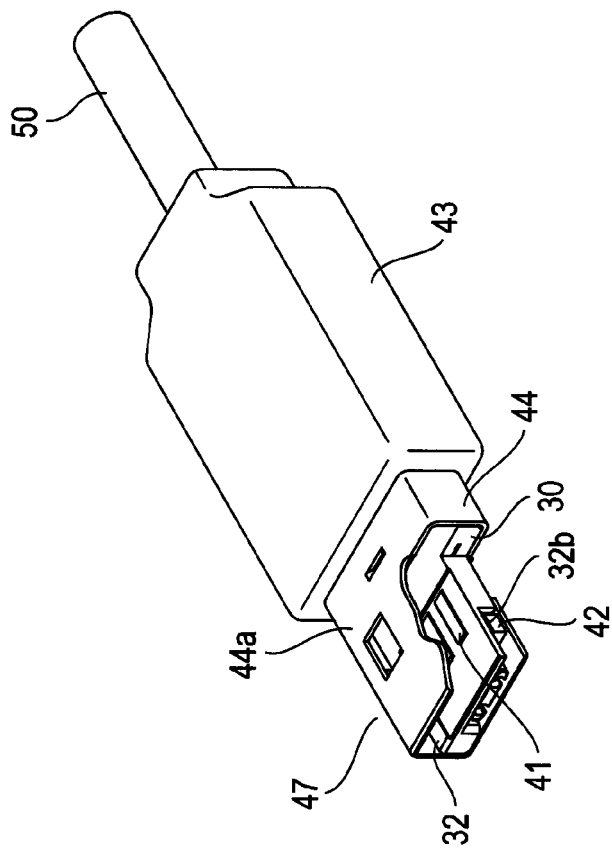
FIG. 2B is a perspective view of a plug of FIG. 2A partially broken.
Figure 2A:
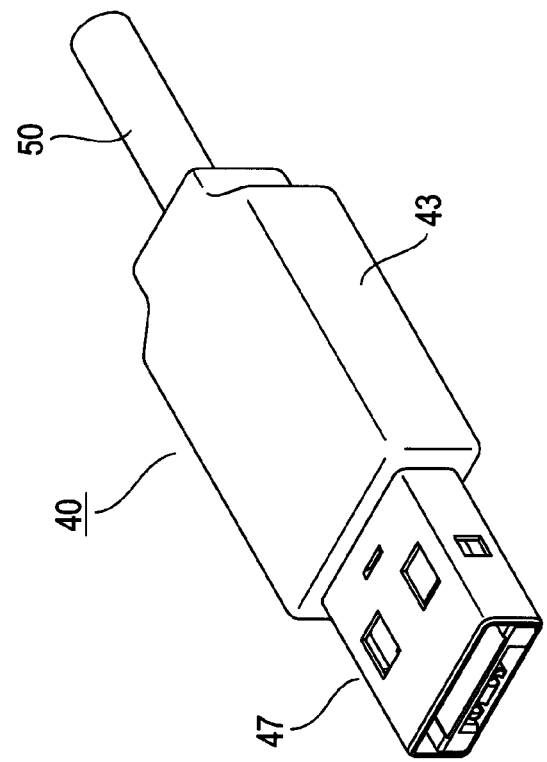
FIG. 2A is a perspective view showing a plug in an optoelectrical connector according to an embodiment of the present invention.
Figure 4:
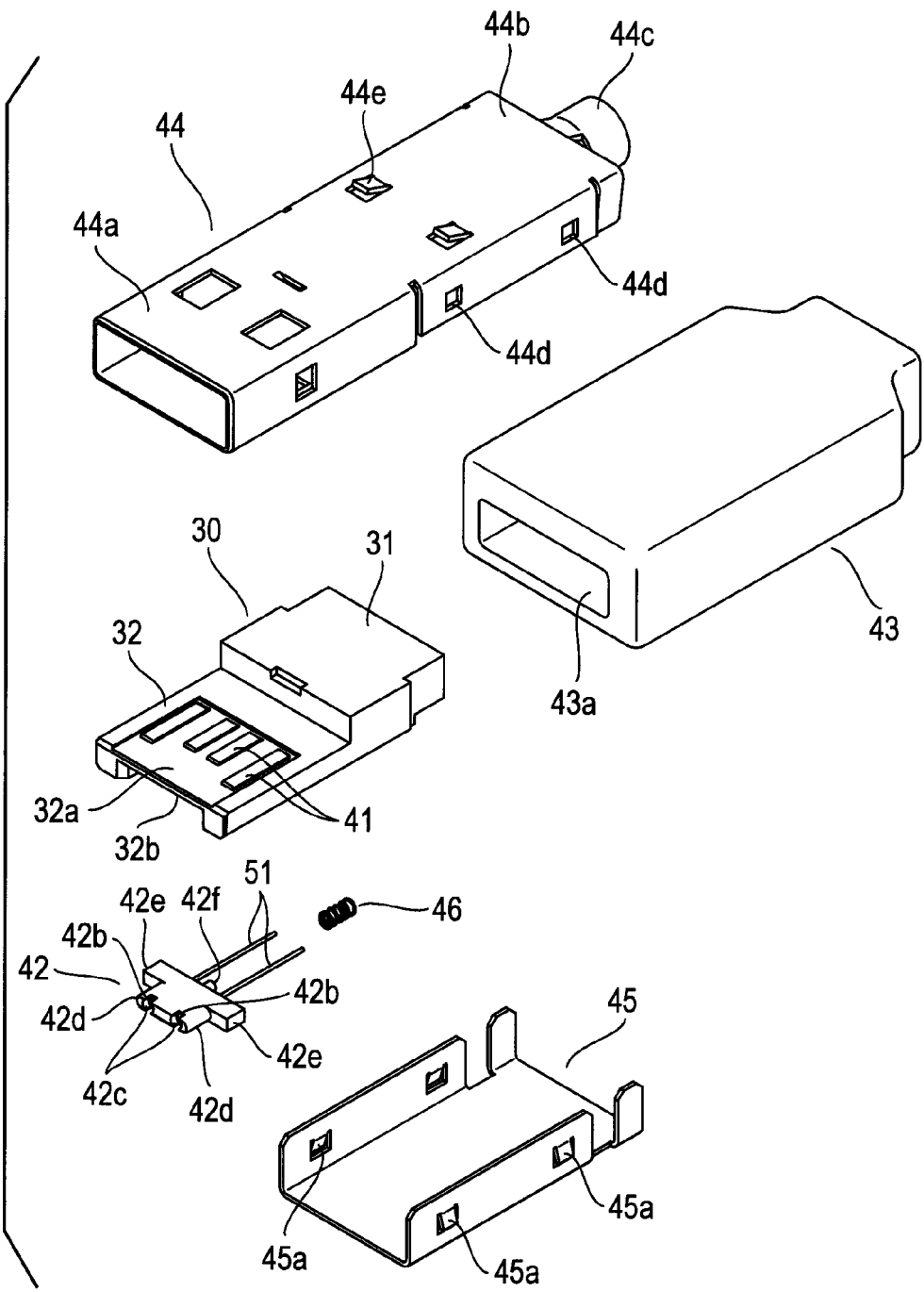
FIG. 4 is an exploded perspective view of the plug of FIG. 2A.
Figure 5A:
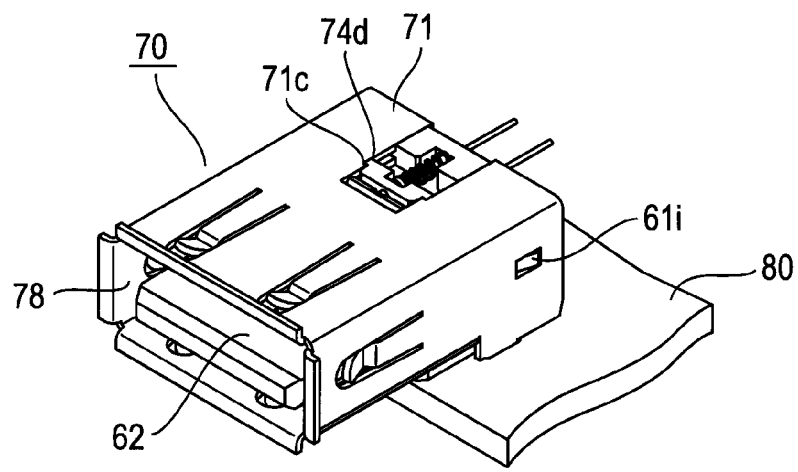
FIG. 5A is a perspective view of a receptacle of the optoelectrical connector according to the embodiment of the present invention.
Figure 5B:
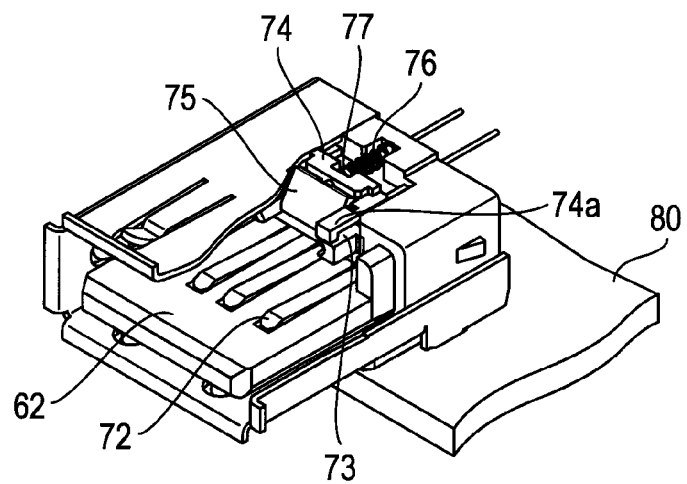
FIG. 5B is a perspective view of the receptacle of FIG. 5A partially broken.

FIGS. 2A and 2B and FIGS. 3A to 3D illustrate a plug in an optoelectrical connector according to an embodiment of the present invention. FIG. 4 illustrates the plug which is disassembled to respective parts.

A plug 40 in this example includes an insulation body 30, terminals 41, an optical member 42, a hood 43, and a metallic shell, and the shell is composed of an upper shell 44 and a lower shell 45, as shown in FIG. 4.

The insulation body 30 includes a base part 31 which has an approximate-parallelepiped shape and a tongue piece 32 which is protruded and extended from a front surface of the base part 31, and is made of resin. A shallow concave part 32a is formed on one plate surface (an upper surface) of the tongue piece 32, and four terminals 41, in this example, constituting an electric connection part are arranged to be disposed on this concave part 32a. The insulation body 30 is shaped such that the terminals 41 are inserted thereinto in this example.

A front half part 44a of the upper shell 44 is formed to have a square tubular shape, and a rear half part 44b extended from the front half part 44a is formed to have no bottom surface of the square tubular shape, that is, to have a square C-shaped cross section. To a rear end of the rear half part 44b, a fixing part 44c that is used to tuck and fix a cable and has a U-shaped cross section is protrusively formed.

The lower shell 45 is fitted and fixed to the rear half part 44b of the upper shell 44 and has a square C-shaped cross section. Two locking pawls 45a are formed on each of both lateral walls of the lower shell 45 by cutting and raising the walls and locking windows 44d with which the locking pawls 45a are engaged to be locked are formed on both lateral walls of the rear half part 44b of the upper shell 44.

The optical member 42 is attached to ends of two optical fibers 51 in this example. The optical member 42 is made of a transparent material. The optical member 42 includes two insertion holes 42a (refer to FIG. 3D) to which the optical fibers 51 are respectively inserted, and is provided with lenses 42b which are integrally formed to be respectively opposed to end surfaces of the optical fibers 51 which are respectively inserted and fixed in the insertion holes 42a. These two lenses 42b are respectively positioned in a pair of concave parts 42c which are formed on a front surface of the optical member 42, and both lateral surfaces, which sandwich these concave parts 42c, of the optical member 42 are respectively semicircular column shaped lateral surfaces 42d. On the rear end side of the both lateral surfaces of the optical member 42, protrusion parts 42e are respectively formed to be mutually protruded outward.

The optical member 42 is housed to be positioned in a concave part 32b which is formed on the front end side of a plate surface (lower surface) which is opposite to the plate surface, on which the terminals 41 are disposed, of the tongue piece 32 of the insulation body 30. In this case, a coil spring 46 is interposed between the optical member 42 and a rear-side wall surface of the concave part 32b, so that the optical member 42 is energized forward by the coil spring 46. On a rear end surface of the optical member 42, a shaft 42f in which the coil spring 46 is inserted and positioned is protrusively formed. Here, the pair of protrusion parts 42e of the optical member 42 is abutted on step parts 32c (refer to FIG. 3D) which are respectively formed on both lateral walls of the concave part 32b, whereby the optical member 42 is held.

The tongue piece 32 of the insulation body 30 which houses the optical member 42 in the concave part 32b thereof is inserted into the front half part 44a of the upper shell 44, and the lower shell 45 is fitted and fixed to the rear half part 44b of the upper shell 44 in a manner to sandwich a part of the base part 31 of the insulation body 30. Then, the hood 43 is attached around the rear half part 44b and a part of the front half part 44a of the upper shell 44, thus configuring the plug 40. The cable 50 is tucked and fixed in the fixing part 44c of the upper shell 44 so as to be led out from the rear end side of the hood 43. The upper shell 44 and the lower shell 45 which are fitted and fixed to each other are housed and fixed in a housing hole 43a of the hood 43. On an upper surface of the upper shell 44, a pair of locking pawls 44e for preventing the upper shell 44 from coming off from the hood 43 is formed.

In the plug 40 having the configuration described above, an insertion fitting part 47 is structured by the upper shell 44 which surrounds the tongue piece 32 of the insulation body 30 and is protruded from the hood 43. The optical member 42 constituting the optical connection part is positioned on a front end of the insertion fitting part 47. On the other hand, the terminals 41 constituting the electric connection part are positioned more rearward than the optical connection part and are exposed to a space between the upper surface of the tongue piece 32 and the upper shell 44.

The configuration of the receptacle to which the plug 40 described above is connected is now described.

Figure 7:
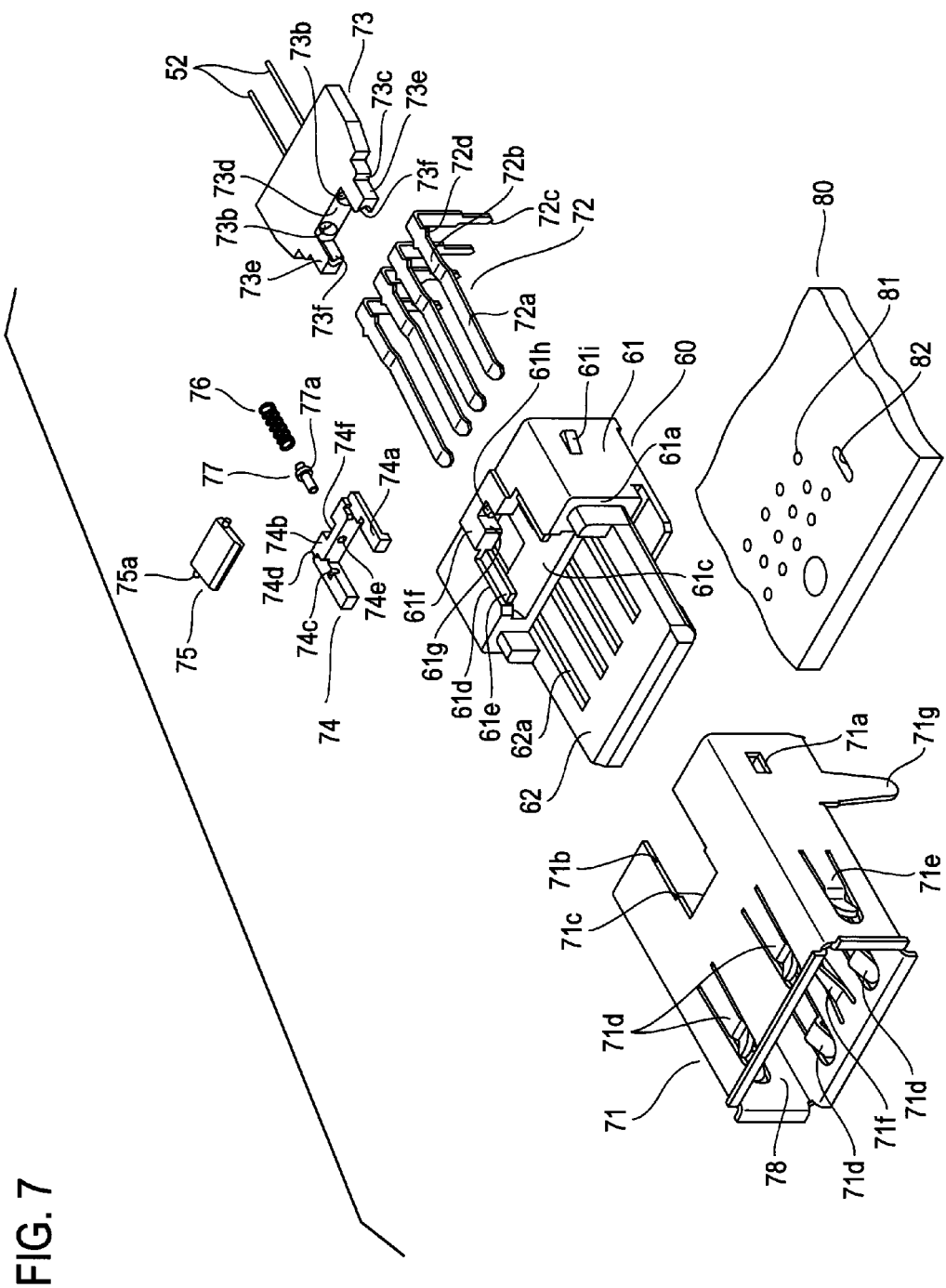
FIG. 7 is an exploded perspective view of the receptacle of FIG. 5A.

FIGS. 5A and 5B and FIGS. 6A to 6D illustrate the configuration of the receptacle according to the embodiment, and FIG. 7 illustrates the receptacle which is disassembled to respective parts.

A receptacle 70 includes an insulation body 60, a metallic shell 71, terminals 72, an optical member 73, a slider 74, a shutter 75, a coil spring 76, and a guide shaft 77 in this example as shown in FIG. 7. A reference numeral 80 in FIGS. 5A, 5B, 6A, 6D, and 7 indicates a substrate and FIGS. 5A and 5B and FIGS. 6A to 6D illustrate a state in which the receptacle 70 is mounted on the substrate 80.

The insulation body 60 includes a base body 61 which has an approximate-parallelepiped shape and a tongue piece 62 which is protruded and extended from a front surface 61a of the base body 61, and is made of a resin. On one plate surface (upper surface) of the tongue piece 62, grooves 62a are formed in parallel to a protruding direction of the tongue piece 62. Four grooves 62a are formed in this example, and the terminals 72 are respectively disposed in the grooves 62a.

Each of the terminals 72 includes a movable contact piece 72a, a press-in part 72b extended from the movable contact piece 72a, and a substrate mounting part 72c which is orthogonally bended and extended from the press-in part 72b so as to be inserted in a hole 81 of the substrate 80 and fixed by soldering. Further, locking protrusions 72d are protrusively formed on both sides in the width direction of the press-in part 72b. The press-in parts 72b are respectively pressed in and fixed to attachment holes 61b which are formed on the base body 61, and thus the terminals 72 are attached to the base body 61. The movable contact pieces 72a are respectively disposed in the grooves 62a, and the substrate mounting parts 72c are extended along a back surface of the base body 61 so as to be protruded to the bottom surface side of the base body 61.

The optical member 73 is attached to ends of two optical fibers 52 as is the case with the optical member 42 of the plug 40. The optical member 73 is made of a transparent element. The optical member 73 includes two insertion holes 73a (refer to FIG. 6D) to which the optical fibers 52 are respectively inserted, and is provided with lenses 73b which are integrally formed to be respectively opposed to end surfaces of the optical fibers 52 which are inserted and fixed in the insertion holes 73a. These two lenses 73b are respectively positioned on a slanted surface 73d, which is formed on a front surface 73c of the optical member 73, in a manner to be slightly recessed. The slanted surface 73d is slanted such that an upper side goes back.

On the both sides, between which the slanted surface 73d is sandwiched, of the front surface 73c of the optical member 73, positioning parts 73e on which the semicircular column shaped lateral surfaces 42d of the optical member 42 of the plug 40 are respectively engaged and positioned are protrusively formed respectively. On mutual inner surfaces of the pair of positioning parts 73e, V-shaped grooves 73f which are respectively engaged with the semicircular column shaped lateral surfaces 42d are respectively formed. In this example, mutual positioning mechanisms of the optical members 42 and 73 are composed of the semicircular column shaped lateral surfaces 42d and the positioning parts 73e.

The optical member 73 having the above described configuration is formed to have a plate shape as a whole, and is inserted into a housing hole 61c which is formed on the base body 61 of the insulation body 60 so as to be attached and fixed to the base body 61. The front surface 73c of the optical member 73 is positioned to be coplanar with the front surface 61a of the base body 61 and therefore the pair of positioning parts 73e are protruded more than the front surface 61a of the base body 61.

On the upper surface of the base body 61, a groove 61d is formed from the front surface 61a side to the rear side, and a bottom surface of the groove 61d is communicated with the housing hole 61c except for both end parts thereof in the width direction of the groove 61d. Parts, which remain on the both end parts in the width direction, of the bottom surface of the groove 61d are mounting surfaces 61e of the slider 74.

The slider 74 includes a pair of leg parts 74a and an intermediate part 74b which connects the leg parts 74a, and has a square C-shape. On upper surfaces of the pair of leg parts 74a, shaft reception concave parts 74c are respectively formed so as to be opposed to each other. The intermediate part 74b has larger thickness than that of the leg parts 74a so as to be protruded upward. On the rear end side of both lateral surfaces of the intermediate part 74b, protrusion parts 74d protruding on the leg parts 74a are respectively formed. Further, a through hole 74e is formed on the center of the intermediate part 74b in a manner to be in parallel to the extending direction of the leg parts 74a, and a cutout 74f is formed on a part, in which the through hole 74e is formed, of the rear end surface of the intermediate part 74b.

The shutter 75 has a rectangular plate-like shape and is provided with shaft parts 75a which are protrusively formed mutually outward, on both ends thereof. These shaft parts 75a are engaged with the shaft reception concave parts 74c which are respectively formed on the pair of leg parts 74a of the slider 74, whereby the shutter 75 is attached to the slider 74. The shutter 75 is supported by the slider 74 in a manner to be rotatable about the shaft parts 75a thereof.

The pair of leg parts 74a of the slider 74 is mounted on the mounting surfaces 61e of the groove 61d of the base body 61, and thus the slider 74 is slidably disposed in the groove 61d. At this time, a guide shaft 77 is inserted through the through hole 74e, which is formed on the intermediate part 74b of the slider 74, from the rear side and further, the coil spring 76 is interposed between a flange part 77a which is formed on the guide shaft 77 and a part which is positioned on the rear side of the groove 61d of the base body 61. An end of the guide shaft 77 is protruded from the through hole 74e so as to be abutted on the upper end side of the shutter 75 which is supported by the slider 74. On a part positioned on the rear side of the groove 61d of the base body 61, a step part 61f which is higher by one step is formed. On the groove 61d side on the center of the step part 61f, a concave part 61g is formed, and a shaft 61h is formed in the concave part 61g. The rear end side of the coil spring 76 is disposed in the concave part 61g and is positioned by the shaft 61h.

The shell 71 is attached to the insulation body 60 on which the slider 74 and the shutter 75 are disposed as described above. The shell 71 has a square tubular shape and is attached so as to surround the insulation body 60. The attachment of the shell 71 is performed by inserting the insulation body 60 from the rear side of the shell 71. Locking protrusions 61i which are protrusively formed respectively on both lateral surfaces of the base body 61 of the insulation body 60 are locked at locking windows 71a which are respectively formed on both lateral surfaces of the shell 71, whereby the shell 71 is attached and fixed to the insulation body 60.

A cutout 71b is formed on the upper surface of the shell 71 by cutting out the upper surface from the rear side. The inner end side of the cutout 71b is slightly narrowed and step parts 71c are formed on a border with respect to the narrowed part. The step part 61f on the upper surface of the base body 61 of the insulation body 60 is positioned on the opening side of the cutout 71b.

The flange part 77a of the guide shaft 77 is energized by energizing force of the coil spring 76 so as to push the intermediate part 74b of the slider 74. Accordingly, the protrusion parts 74d which are protrusively formed on the both sides of the intermediate part 74b are respectively abutted on the step parts 71c of the cutout 71b of the shell 71. Further, the upper end side of the shutter 75 is pressed by the guide shaft 77, so that rotating force is applied around the shaft parts 75a, that is, the shutter 75 is rotatably energized. Accordingly, the lower half side of the shutter 75 is abutted on the slanted surface 73d which is formed on the front surface 73c of the optical member 73 as shown in FIG. 6D. That is, the shutter 75 is closed, and the slanted surface 73d, on which the lenses 73b are positioned, of the optical member 73 is lidded by the shutter 75. Here, the end sides of the leg parts 74a of the slider 74 are protruded more than the front surface 61a of the base body 61 of the insulation body 60.

In a part on which the tongue piece 62 is positioned, a housing space 78 into which the insertion fitting part 47 of the plug 40 is inserted is formed by being surrounded by the shell 71. On both of an upper surface and a bottom surface of the shell 71 constituting this housing space 78, a pair of spring pieces 71d which elastically contact with a outer surface (an outer surface of the upper shell 44 of the plug 40) of the insertion fitting part 47 of the plug 40 which is inserted is formed by cutting and raising the shell 71 inward. In a similar manner, spring pieces 71e are respectively formed on both lateral surfaces of the shell 71. Further, on a bottom surface of the shell 71, a spring piece 71f of which a loose end faces the deep side of the housing space 78 in an opposite manner to the spring pieces 71d and 71e is formed. On the rear end side of the shell 71, terminal parts 71g which are respectively protruded and extended downward from the both lateral surfaces of the shell 71 are formed. The terminal parts 71g are respectively inserted and fixed in holes 82 of the substrate 80.

In the receptacle 70 configured described above, the optical member 73 constituting the optical connection part is disposed on the deep side of the housing space 78, the movable contact pieces 72a of the terminals 72 constituting the electric connection part are disposed more frontward than the optical connection part, and the loose end sides of the movable contact pieces 72a are slightly protruded on the upper surface of the tongue piece 62. Here, the optical member 73 is attached to the base body 61 on the upper surface side, on which the movable contact pieces 72a are positioned, of the tongue piece 62, and the shutter 75 is positioned on the immediate front (a front surface) of the optical member 73.

Connection of the plug 40 and the receptacle 70 which are described above will be now described.

Figure 8:
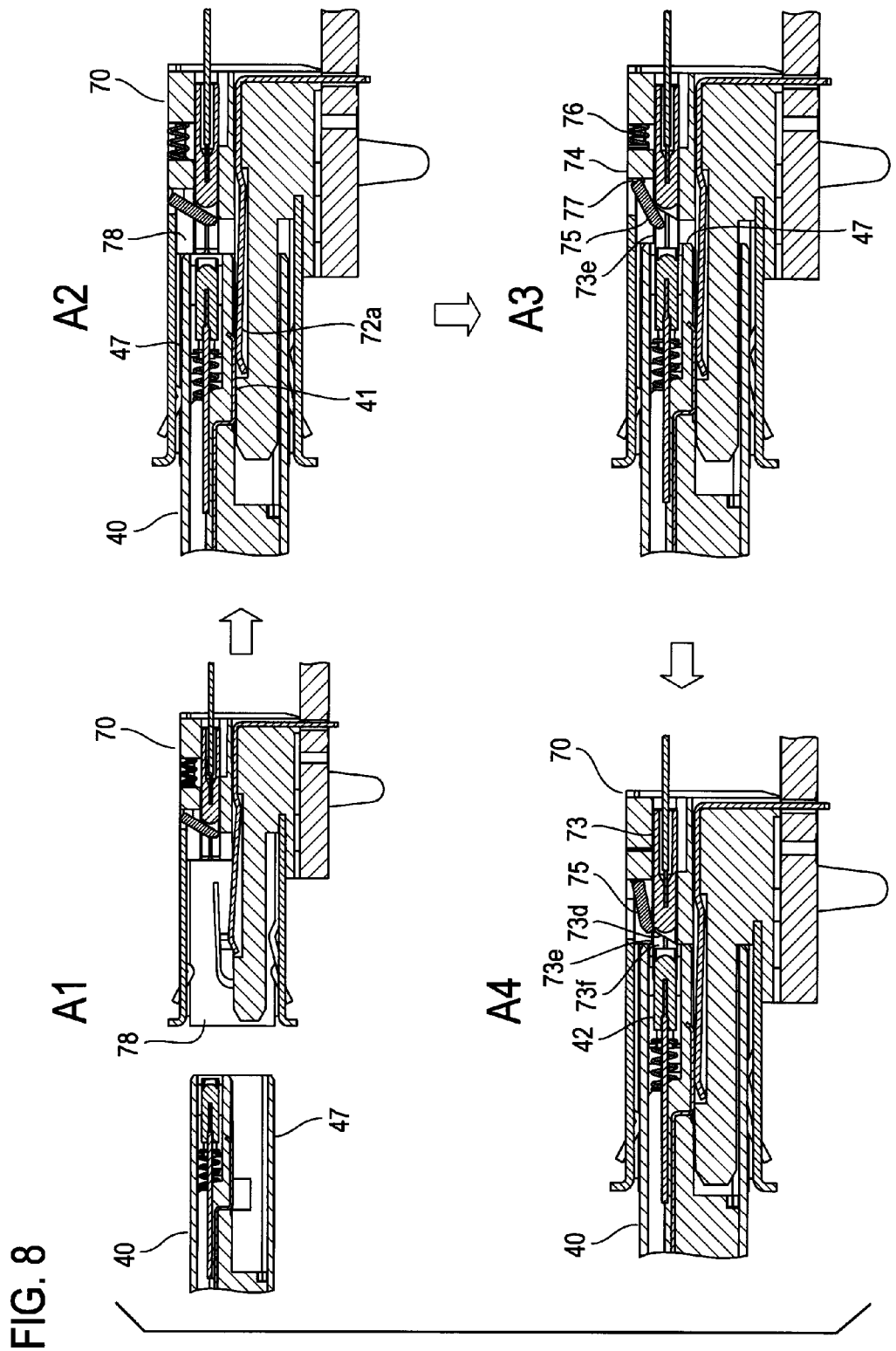
FIG. 8 illustrates a state that a plug is inserted and fit in the receptacle of FIG. 5A.

FIG. 8 illustrates a state that the insertion fitting part 47 of the plug 40 is inserted and fitted in the housing space 78 of the receptacle 70 so as to be connected. As shown in A2 of FIG. 8, when the insertion fitting part 47 is inserted into the housing space 78, the terminals 41 of the plug 40 and the movable contact pieces 72a of the terminals 72 of the receptacle 70 are first brought into contact with each other so as to be electrically connected. When the insertion fitting part 47 is further inserted, the front end of the insertion fitting part 47 is abutted on the pair of leg parts 74a of the slider 74 and therefore the slider 74 is pushed to be slid back by the insertion fitting part 47. As the slider 74 is slid back, the shutter 75 is slid back together with the slider 74 while rotating about the shaft parts 75a thereof. This state is shown in A3 of FIG. 8.

When the insertion fitting part 47 is furthermore inserted, the shutter 75 further rotates and slides back and accordingly, the shutter 75 completely leaves from the slanted surface 73d of the optical member 73 so as to be open as shown in A4 of FIG. 8. At this time, the semicircular column shaped lateral surfaces 42d of the optical member 42 of the plug 40 are respectively engaged with the V-shaped grooves 73f provided on the inner sides of the positioning parts 73e of the optical member 73 of the receptacle 70, and thus the optical member 73 and the optical member 42 are mutually positioned so as to be optically connected with each other.

Even though the shutter 75 is energized toward a closing direction by the coil spring 76, the shutter 75 opens against the energizing force while accompanying with the slide back of the slider 74. In the open state of the shutter 75, the energizing force of the coil spring 76 is applied to a part positioned on the rear end of the shutter 75. Accordingly, when the plug 40 is pulled out from the receptacle 70 and thus the insertion fitting part 47 is detached from the housing space 78, the shutter 75 returns to an initial closing position and the slider 74 also returns to an initial position at the same time. Here, after the optical connection is released in an opposite manner to the inserting and fitting time, the shutter 75 is closed and then the electric connection is released.

The energizing force of the coil spring 76 is applied to the shutter 75 through the guide shaft 77 and the end of the guide shaft 77 is abutted on the shutter 75. A part, which is abutted on the end of the guide shaft 77, of the shutter 75 is formed to have a curved surface of which a section is a circular shape so that the shutter 75 point-contacts with the end of the guide shaft 77. Accordingly, the shutter 75 can favorably rotate in a state that the end of the guide shaft 77 is abutted on the shutter 75. Further, the front surface of the optical member 73 on which the shutter 75 abuts is formed as the slanted surface 73d which follows the direction in which the shutter 75 slides back, so that the shutter 75 can favorably rotate in this regard as well.

As described above, according to this example, when the insertion fitting part 47 of the plug 40 is inserted into the housing space 78 of the receptacle 70, the electric connection is first performed. Then, the shutter 75 of the receptacle 70 opens when the electric connection is almost completed, and thus the optical connection is performed. Accordingly, even if metal abrasion powder is generated by a slide between the terminals 41 of the plug 40 and the terminals 72 of the receptacle 70, attachment of the metal abrasion powder to the optical member 73 of the receptacle 70 is prevented by the shutter 75 and therefore such situation that the metal abrasion power attaches to the optical member 73 does not occur.

On the other hand, the optical member 42 of the plug 40 is positioned on the front end of the insertion fitting part 47, thus being positioned more frontward than the terminals 41. Therefore, even if metal abrasion powder is generated by the slide between the terminals 41 and the terminals 72, the metal abrasion powder hardly attaches to the optical member 42.

Consequently, according to this example, such problem can be cut down that optical coupling efficiency is deteriorated by attachment of the metal abrasion powder to the optical members 73 and 42.

As for the plug 40, the optical member 42 constituting the optical connection part is positioned on the front end of the insertion fitting part 47. Therefore, even if the optical member 42 is contaminated, the optical member 42 can be easily cleaned. On the other hand, as for the receptacle 70, the optical member 73 constituting the optical connection part is positioned on the deep side, which is hard to clean, of the housing space 78. However, the shutter 75 is always closed other than the optical connection time as described above, so that the optical member 73 is not contaminated and cleaning is unnecessary.

Further, the shutter 75 is always closed other than the optical connection time, so that not only attachment of metal abrasion powder but also attachment of dusts and the like in the atmosphere, for example, are suppressed, and exposure of a retina to optical energy is also prevented.

Figure 9A:
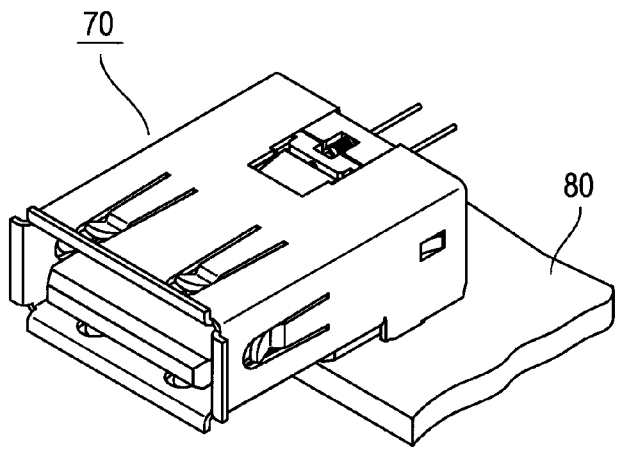
FIG. 9A is a perspective view showing a state that a shutter of the receptacle of FIG. 5A is opened, without illustrating the plug.
Figure 9B:
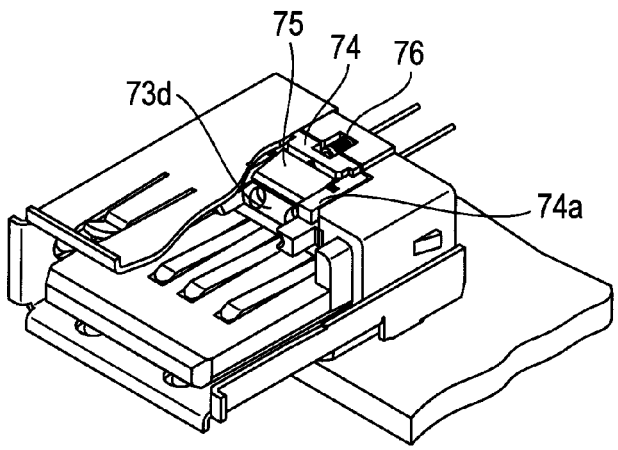
FIG. 9B is a perspective view showing the receptacle of FIG. 9A partially broken.
Figure 9C:
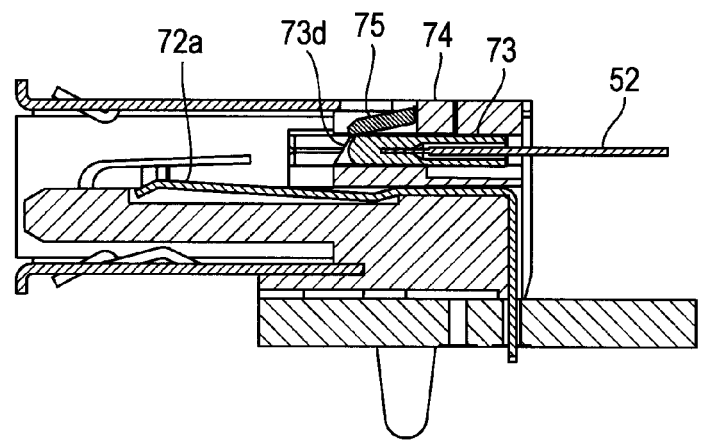
FIG. 9C is an enlarged sectional view of the state of FIG. 9A.
Figure 10A:
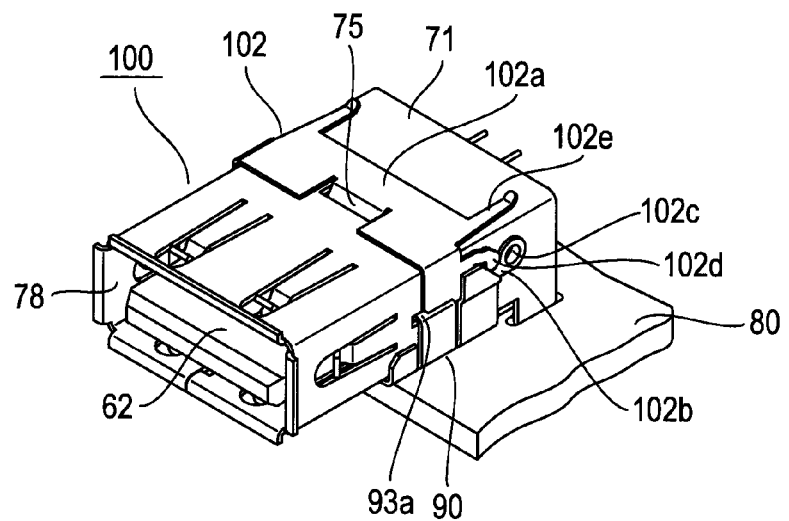
FIG. 10A is a perspective view showing a receptacle of an optoelectrical connector according to another embodiment of the present invention.
Figure 10B:
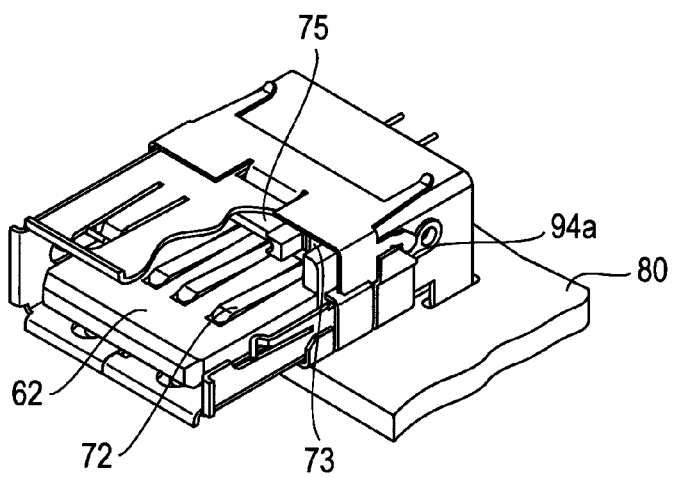
FIG. 10B is a perspective view of the receptacle of FIG. 10A partially broken.
Figure 11A:
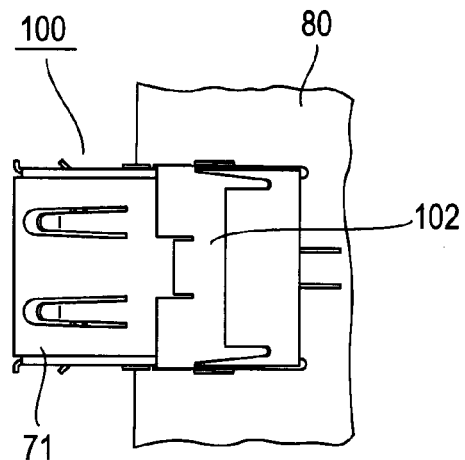
FIG. 11A is a plan view of the receptacle of FIG. 10A.
Figure 11C:
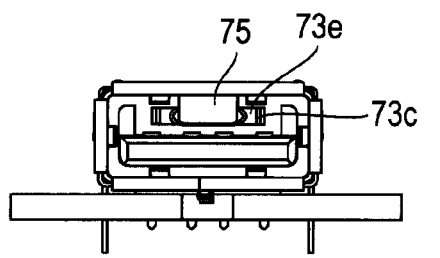
FIG. 11C is a front elevational view of the receptacle of FIG. 10A.
Figure 11B:
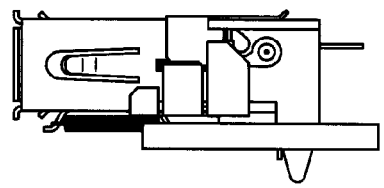
FIG. 11B is a lateral view of the receptacle of FIG. 10A.
Figure 11D:
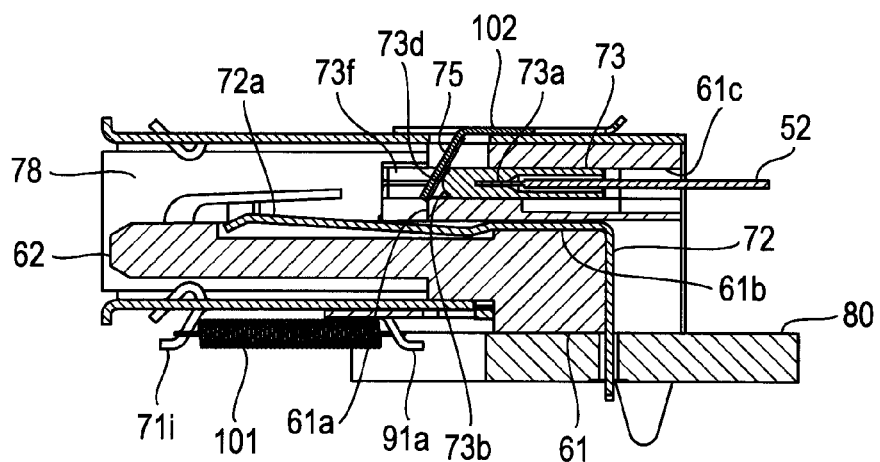
FIG. 11D is an enlarged sectional view of the receptacle of FIG. 10A.

FIGS. 9A to 9C illustrate the receptacle 70 of which the shutter 75 is opened without illustrating the plug 40.

Figure 12:
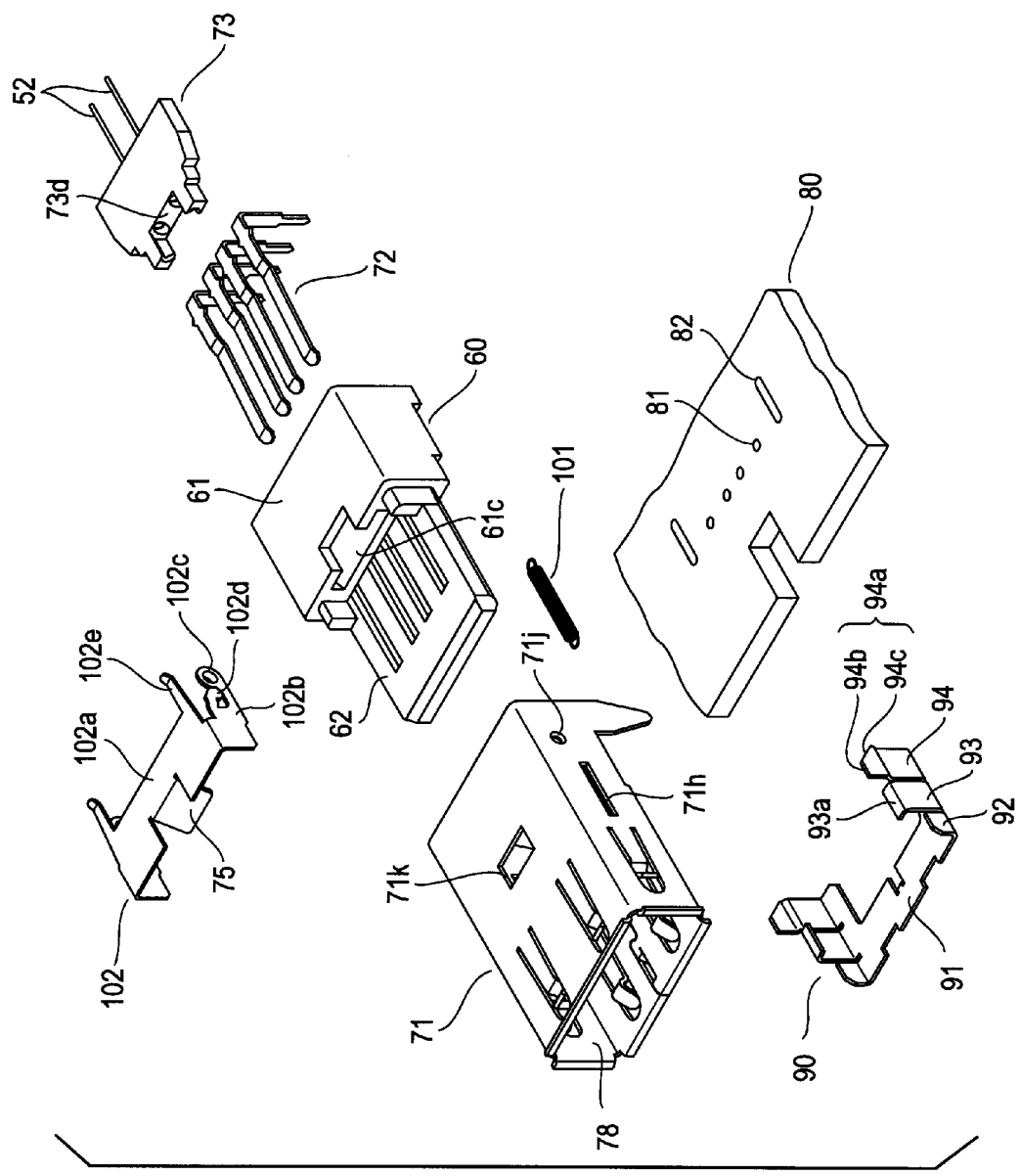
FIG. 12 is an exploded perspective view of the receptacle of FIG. 10A.

A receptacle according to another embodiment is now described with reference to FIGS. 10A and 10B, FIGS. 11A to 11D, and FIG. 12. FIG. 12 illustrates a receptacle 100 of FIG. 10A which is disassembled into respective parts. Here, parts corresponding to those of the receptacle 70 described above are given the same reference characters and detailed description thereof is omitted.

Unlike the receptacle 70, the receptacle 100 is provided with a slider 90 on the outer side of the shell 71.

The slider 90 includes coupling part 91 which is positioned along the bottom surface of the shell 71 and leg parts which are bent and extended respectively from both ends of the coupling part 91 so as to be positioned respectively along both lateral surfaces of the shell 71. Each of the leg parts is composed of three parts in the front-back direction of the housing space 78 in this example. Namely, each of the leg parts includes a first leg part 92, a second leg part 93, and a third leg part 94 from the front side.

The length of the first leg part 92 is small, while the lengths of the second leg part 93 and the third leg part 94 are large. On ends of the pair of second leg parts 93 which are respectively positioned on both ends of the coupling part 91, bent parts 93a which are mutually bent inward are respectively formed. Further, on ends of the pair of third leg parts 94 which are respectively positioned on the both ends of the coupling part 91, cams (cam shapes) 94a are respectively formed. Each of the cams 94a is composed of a horizontal surface 94b which is parallel to the front-back direction of the housing space 78 (an insertion direction of the insertion fitting part 47 of the plug 40) and a slanted surface 94c which is obtained by cutting a rear end side angular part of the horizontal surface 94b. Here, a part on which the cam 94a is formed is positioned one-step outside with respect to the base end side of the third leg part 94.

The bent parts 93a on the ends of the second leg parts 93 are respectively inserted through slits 71h which are respectively formed on the both lateral surfaces of the shell 71, and thus the slider 90 configured as described above is attached to the shell 71. The slider 90 is guided by the slits 71h so as to be slidable in the front-back direction of the housing space 78. Here, a coil spring 101 is mounted on a hook 71i (refer to FIG. 11D) which is formed by cutting and raising the bottom surface of the shell 71 and a hook 91a which is formed by cutting and raising the coupling part 91 of the slider 90, and the slider 90 is energized toward the opening side of the housing space 78 by this coil spring 101.

On the other hand, a rotating member 102 which is rotated and operated by the cams 94a of the slider 90 is disposed on the outside of the shell 71. The rotating member 102 includes a plate part 102a which is disposed along the upper surface of the shell 71, a pair of arm parts 102b which are bent and extended from the plate part 102a so as to be respectively positioned along the both lateral surfaces of the shell 71, and shaft parts 102c which are formed on ends of the pair of arm parts 102b so as to be protruded mutually inward. Further, on the pair of arm parts 102b, follower parts 102d respectively corresponding to the cams 94a of the slider 90 are respectively formed to be positioned one step outside with respect to the arm parts 102b. Each of the follower parts 102d has a circular outer shape except for a coupling part with the arm part 102b.

The shutter 75 is formed to be integrated with the rotating member 102. The shutter 75 is formed by cutting and raising the front side of the plate part 102a of the rotating member 102 so as to be a slanted surface slanted with respect to the plate part 102a. Further, on both ends in the width direction of the plate part 102a, spring pieces 102e are respectively formed in a manner to protrude rearward.

The shaft parts 102c are pivotally supported respectively at holes 71j which are respectively formed on the both lateral surfaces of the shell 71 and thus the rotating member 102 having the configuration described above is rotatably attached to the shell 71. In this state, the plate part 102a of the rotating member 102 is abutted on the upper surface of the shell 71, and the shutter 75 is inserted into a window 71k which is formed on the upper surface of the shell 71 so as to be disposed on the slanted surface 73d which is the front surface of the optical member 73 via the window 71k.

Figure 13:
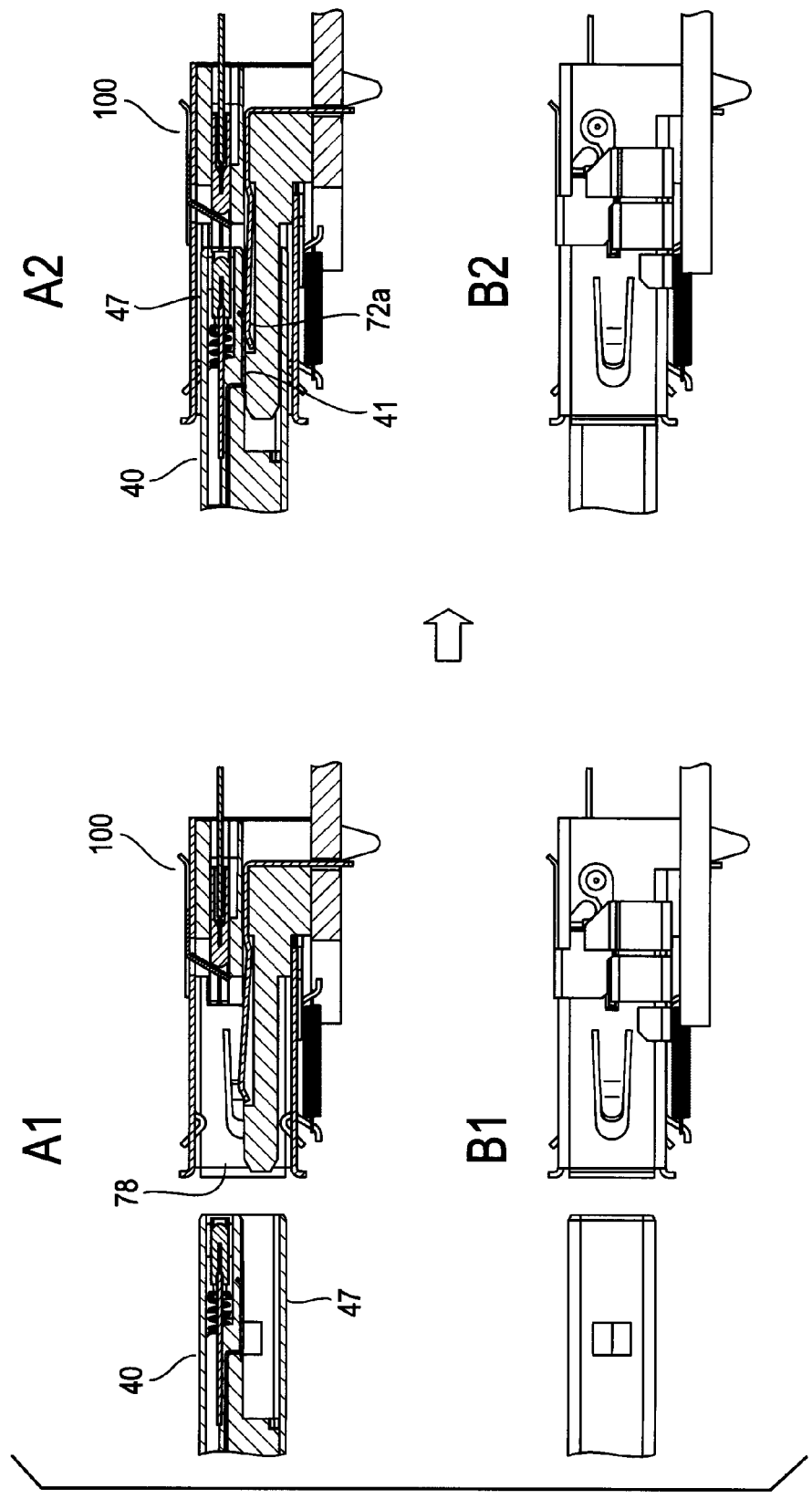
FIG. 13 illustrates a state that a plug is inserted and fit in the receptacle of FIG. 10A.
Figure 14:
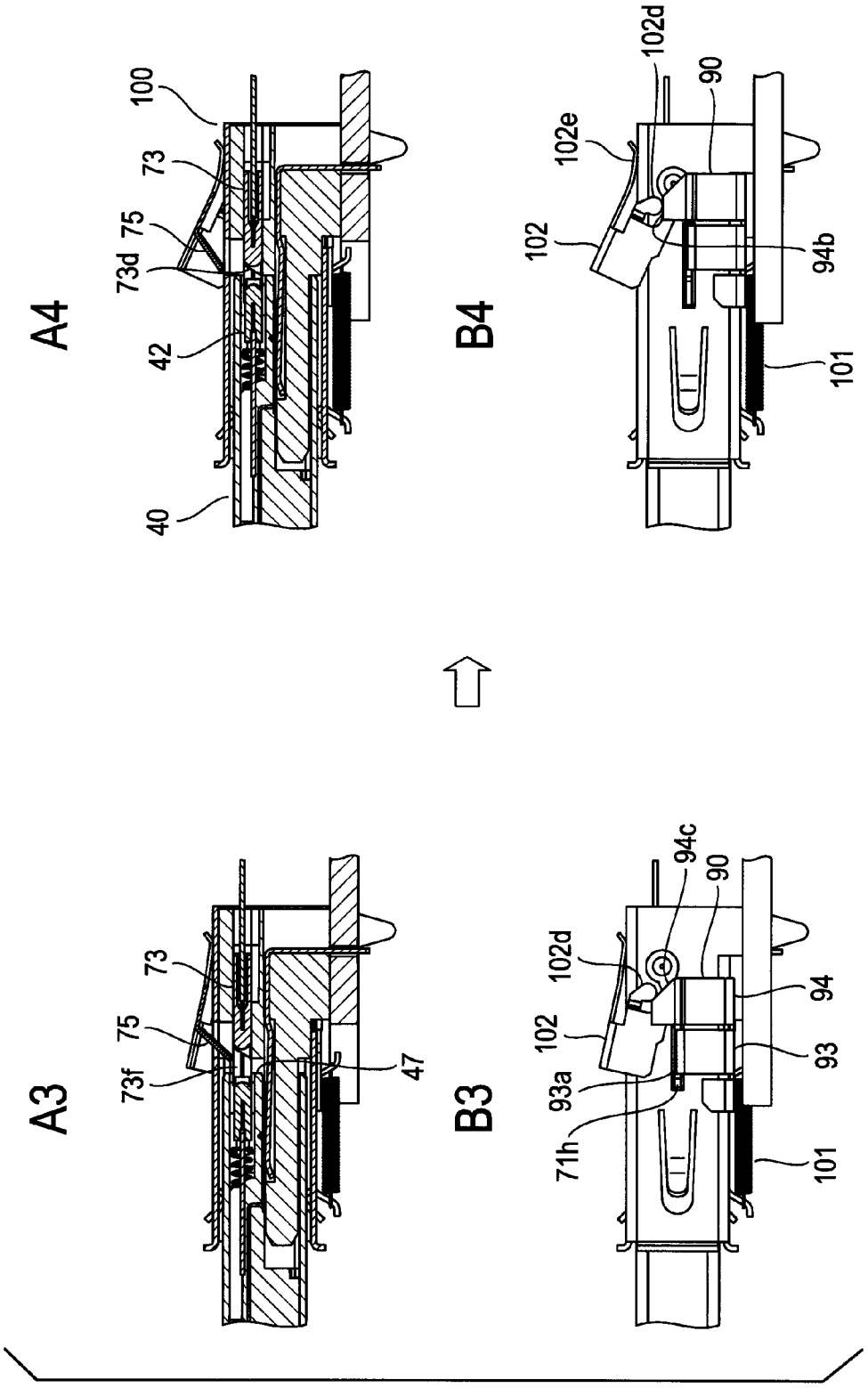
FIG. 14 illustrates a state that a plug is inserted and fit in the receptacle of FIG. 10A.

FIGS. 13 and 14 illustrate a state that the insertion fitting part 47 of the plug 40 is inserted and fitted in the housing space 78 of the receptacle 100 described above so as to be connected. When the insertion fitting part 47 is inserted into the housing space 78 as shown in A2 and B2 of FIG. 13, the terminals 41 of the plug 40 and the movable contact pieces 72a of the terminals 72 of the receptacle 100 are first brought into contact with each other so as to be electrically connected.

When the insertion fitting part 47 is further inserted, the front end of the insertion fitting part 47 is abutted on the bent parts 93a of the second leg parts 93, which are protruded to the housing space 78 (the inside of the shell 71), of the slider 90 via the slits 71h and thereby the slider 90 is pushed by the insertion fitting part 47 so as to be slid back against the energizing force of the coil spring 101. As the slider 90 is slid back, the follower parts 102d of the rotating member 102 moves (are pushed up) in a manner to follow the slanted surfaces 94c of the cams 94a which are formed on the third leg parts 94 of the slider 90 and accordingly the rotating member 102 rotates. A3 and B3 of FIG. 14 illustrate this state.

When the insertion fitting part 47 is furthermore inserted, the follower parts 102d of the rotating member 102 run on the horizontal surfaces 94b of the cams 94a by the slide back of the slider 90 as shown in B4 of FIG. 14 and thus the rotating member 102 completes the rotation. In this state, the shutter 75 has completely left from the slanted surface 73d of the optical member 73 and has completely left from the housing space 78 as well. At this time, the optical member 73 and the optical member 42 are mutually positioned by engagement between the positioning parts 73e and the semicircular column shaped lateral surfaces 42d so as to be optically connected with each other.

In this state that the shutter 75 is opened, the pair of spring pieces 102e which are formed on the rotating member 102 are curved as shown in B4 of FIG. 14, and the rotating member 102 is energized by the elastic restoring force of the spring pieces 102e. Further, the energizing force of the coil spring 101 is applied to the slider 90. Therefore, when the plug 40 is pulled out from the receptacle 100 and thus the insertion fitting part 47 is detached from the housing space 78, the slider 90 and the rotating member 102 return to respective initial positions, that is, the shutter 75 is closed.

As described above, the shutter 75 of the receptacle 100 operates in the same manner as the shutter 75 of the receptacle 70 and thus attachment of metal abrasion powder with respect to the optical member 73 of the receptacle 100 is prevented as is the case with the receptacle 70.

Figure 15A:
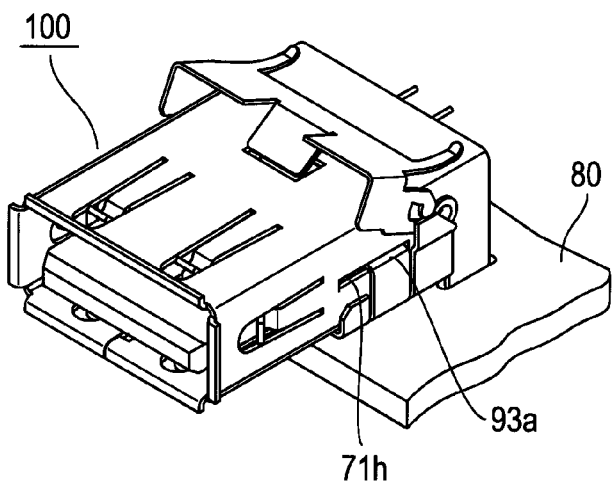
FIG. 15A is a perspective view showing a state that a shutter of the receptacle of FIG. 10A is opened, without illustrating the plug.
Figure 15B:
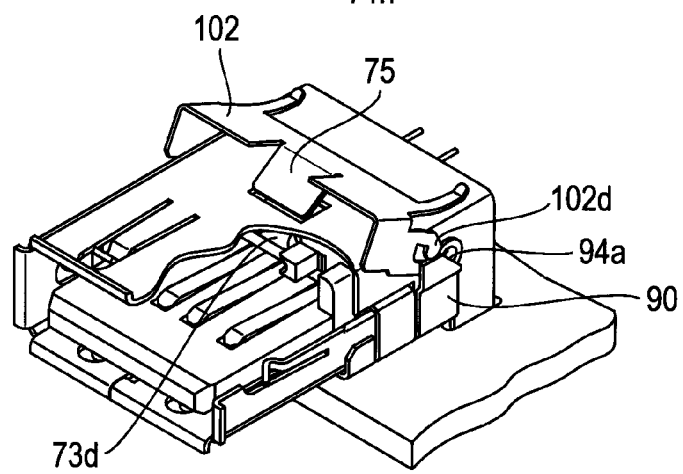
FIG. 15B is a perspective view of the receptacle of FIG. 15A partially broken.
Figure 15C:
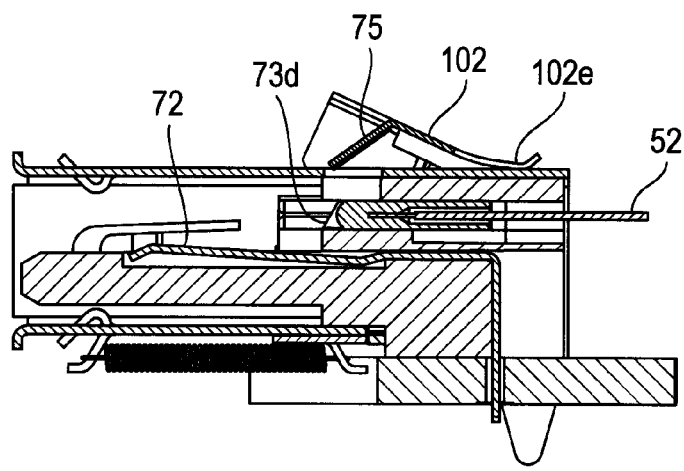
FIG. 15C is an enlarged sectional view of the state of FIG. 15A.

FIGS. 15A to 15C illustrate the receptacle 100 in a state that the shutter 75 is opened, without illustrating the plug 40.

What is claimed is:

1. An optoelectrical connector, comprising:
    a plug configured to include an insertion fitting part; and
    a receptacle configured to include a housing space into which the insertion fitting part of the plug is inserted; wherein
    the plug includes an optical connection part on a front end of the insertion fitting part and an electric connection part positioned more rearward than the optical connection part,
    the receptacle includes:
        an optical connection part on a deep side of the housing space and an electric connection part positioned more frontward than the optical connection part,
        a shutter that is provided more rearward than the electric connection part and on an immediate front of the optical connection part,
        an insulation body that is composed of a base body and a tongue piece that is protruded and extended from the base body,
        a shell that surrounds the insulation body so as to form the housing space on a part in which the tongue piece is positioned,
        terminals that are disposed on one plate surface of the tongue piece so as to constitute the electric connection part,
        an optical member that is attached to ends of optical fibers and is inserted and fixed in a housing hole that is formed on the one plate surface side on the base body so as to constitute the optical connection part,
        a slider that makes the shutter open against energizing force and a spring that applies the energizing force to the shutter, wherein:
    the slider includes a pair of legs and is slidably disposed on a groove that is formed on the base body,
    the shutter is disposed on a front surface of the optical member,
    the shutter has a plate shape, and shafts that are respectively formed mutually outward on both ends of the plate shape are engaged respectively with shaft reception concave parts that are respectively formed on the pair of legs,
    the shutter is configured to open when the optical connection part of the plug and the optical connection part of the receptacle are optically connected with each other, and after the electric connection part of the plug and the electric connection part of the receptacle are electrically connected with each other by the insertion of the insertion fitting part to the housing space, the slider is pushed by the front end of the insertion fitting part so as to slide back, the shutter slides back and opens while rotating about the shafts along with the slide back of the slider, and the energizing force is applied to a part positioned on a rear end of the shutter in the open state.

2. The optoelectrical connector according to claim 1, wherein
    the plug includes
    an insulation body that is composed of a base part and a tongue piece that is protruded and extended from the base part,
    a shell that surrounds the insulation body so as to constitute the insertion fitting part,
    terminals that are disposed on one plate surface of the tongue piece and are exposed to a space between the one plate surface and the shell so as to constitute the electric connection part, and
    an optical member that is attached to ends of optical fibers and is positioned in a concave part that is formed on the other plate surface of the tongue piece so as to constitute the optical connection part.

3. The optoelectrical connector according to claims 1 or 2, wherein a front surface, on which the shutter is disposed, of the optical member is formed to be a slanted surface following a direction in which the shutter leaves.

4. The optoelectrical connector according to claims 1 or 2, wherein
    both of the optical member of the plug and the optical member of the receptacle are made of a transparent material and are provided with lenses that are formed to be respectively integrated with the optical members in a manner to be opposed to end surfaces of the optical fibers, and
    positioning mechanisms by which both of the optical members are mutually positioned are formed on both of the optical members.

5. An optoelectrical connector, comprising:
    a plug configured to include an insertion fitting part; and
    a receptacle configured to include a housing space into which the insertion fitting part of the plug is inserted; wherein
    the plug includes an optical connection part on a front end of the insertion fitting part and an electric connection part positioned more rearward than the optical connection part,
    the receptacle includes:
        an optical connection part on a deep side of the housing space and an electric connection part positioned more frontward than the optical connection part,
        an insulation body that is composed of a base body and a tongue piece that is protruded and extended from the base body,
        a shell that surrounds the insulation body so as to form the housing space on a part in which the tongue piece is positioned,
        terminals that are disposed on one plate surface of the tongue piece so as to constitute the electric connection part,
        an optical member that is attached to ends of optical fibers and is inserted and fixed in a housing hole that is formed on the one plate surface side on the base body so as to constitute the optical connection part,
        a slider that is disposed on an outside of the shell, is composed of a coupling part, the coupling part being disposed along a bottom surface of the shell, and a pair of leg parts, the leg parts being bent and extended from the coupling part and being disposed respectively along both lateral surfaces of the shell, and is set to be slidable in an insertion direction of the insertion fitting part by being guided by slits, the slits being formed on the both lateral surfaces, in a manner that parts of ends of the leg parts are bent mutually inward and inserted through the slits, a spring that energizes the slider in a direction opposite to the insertion direction, and a rotating member that is disposed on the outside of the shell, is composed of a plate part, the plate part being disposed along the upper surface of the shell, and a pair of arm parts, the arm parts being bent and extended from the plate part and are disposed respectively along the both lateral surfaces of the shell, and is set to be rotatable in a manner that ends of the arm parts are pivotally supported respectively on the both lateral surfaces, cams that include a horizontal surface, the horizontal surface being parallel to the insertion direction, and a slanted surface are formed on other parts, the other parts being positioned more rearward than the parts of the leg parts, follower parts corresponding to the cams are formed on the arm parts, and a shutter is provided on an immediate front of the optical connection part of the receptacle, is formed from the plate part of the rotating member and is disposed on a front surface of the optical member through a window that is formed on the upper surface of the shell, the shutter is configured to open when the optical connection part of the plug and the optical connection part of the receptacle are optically connected with each other, and after the electric connection part of the plug and the electric connection part of the receptacle are electrically connected with each other by the insertion of the insertion fitting part to the housing space, the ends of the leg parts, the ends of the leg parts being respectively inserted through the slits, are pushed by the front end of the insertion fitting part, so that the slider slides back, and along with the slide back of the slider, the follower parts move along the slanted surface and the horizontal surface of the cams, thus rotating the rotating member and opening the shutter.

6. The optoelectrical connector according to claim 5, wherein the plug includes:

an insulation body that is composed of a base part and a tongue piece that is protruded and extended from the base part, a shell that surrounds the insulation body so as to constitute the insertion fitting part, terminals that are disposed on one plate surface of the tongue piece and are exposed to a space between the one plate surface and the shell so as to constitute the electric connection part, and an optical member that is attached to ends of optical fibers and is positioned in a concave part that is formed on the other plate surface of the tongue piece so as to constitute the optical connection part.

7. The optoelectrical connector according to claim 5 or 6, wherein a spring piece that energizes the rotating member in a direction in which the shutter is closed is integrally formed on the plate part of the rotating member.

8. The optoelectrical connector according to claim 7, wherein a front surface, on which the shutter is disposed, of the optical member is formed to be a slanted surface following a direction in which the shutter leaves.

9. The optoelectrical connector according to claim 5 or 6, wherein a front surface, on which the shutter is disposed, of the optical member is formed to be a slanted surface following a direction in which the shutter leaves.

10. The optoelectrical connector according to claim 5 or 6, wherein both of the optical member of the plug and the optical member of the receptacle are made of a transparent material and are provided with lenses that are formed to be respectively integrated with the optical members in a manner to be opposed to end surfaces of the optical fibers, and positioning mechanisms by which both of the optical members are mutually positioned are formed on both of the optical members.

* * * * *